(12) United States Patent
Palmer et al.

(10) Patent No.: US 11,226,844 B1
(45) Date of Patent: Jan. 18, 2022

(54) UNIVERSAL, PROACTIVE, AND DYNAMIC SCALING OF COMPUTING RESOURCES

(71) Applicant: Dialpad, Inc., San Francisco, CA (US)

(72) Inventors: James Palmer, Novato, CA (US); Kevin James, San Francisco, CA (US)

(73) Assignee: DIALPAD, INC., San Ramon, CA (US)

( * ) Notice: Subject to any disclaimer, the term of this patent is extended or adjusted under 35 U.S.C. 154(b) by 195 days.

(21) Appl. No.: 16/430,215

(22) Filed: Jun. 3, 2019

(51) Int. Cl.
*G06F 9/50* (2006.01)
*G06F 17/18* (2006.01)
*G06N 20/00* (2019.01)

(52) U.S. Cl.
CPC .......... *G06F 9/5011* (2013.01); *G06F 9/5027* (2013.01); *G06F 17/18* (2013.01); *G06N 20/00* (2019.01)

(58) Field of Classification Search
CPC ....... G06F 9/5011; G06F 9/5027; G06F 17/18
See application file for complete search history.

(56) References Cited

U.S. PATENT DOCUMENTS

| | | | | |
|---|---|---|---|---|
| 10,484,301 B1* | 11/2019 | Shukla | ............... | H04L 41/0896 |
| 2002/0093948 A1* | 7/2002 | Dertz | .................. | H04L 47/801 370/355 |
| 2015/0039764 A1* | 2/2015 | Beloglazov | ............ | H04L 47/70 709/226 |
| 2015/0227434 A1* | 8/2015 | Goebel | .............. | G06F 11/1448 707/645 |
| 2017/0109649 A1* | 4/2017 | Baughman | ............. | G06N 20/00 |
| 2018/0013636 A1* | 1/2018 | Seetharamaiah | ..... | H04L 41/147 |
| 2018/0046164 A1* | 2/2018 | Drees | ...................... | G06F 3/048 |
| 2018/0241812 A1* | 8/2018 | Marchetti | ........... | H04L 67/1023 |
| 2018/0349202 A1* | 12/2018 | Sharma | ................ | G06F 9/5077 |
| 2020/0160246 A1* | 5/2020 | Pandey | ................ | G06Q 10/067 |

OTHER PUBLICATIONS

Morais et al. Autoflex: Service Agnostic Auto-scaling Framework for IaaS Deployment Models, [online] ResearchGate., pp. 1-9. Retrieved From the Internet <file:///C:/Users/jlabud/Downloads/ccgrid2013_camera_ready.pdf> (Year: 2016).*

* cited by examiner

*Primary Examiner* — Emerson C Puente
*Assistant Examiner* — Jonathan R Labud
(74) *Attorney, Agent, or Firm* — Patent Law Works LLP

(57) ABSTRACT

A proactive autoscaling system can use heuristics and machine learning to proactively, dynamically and automatically scale computing resources allocated to applications up and down, prior to scaling events that cause changes in load levels. The proactive autoscaling system may be stateless, and may be agnostic to use case, platform, field of endeavor, or communication protocol used by the applications. The proactive autoscaling system gleans metrics in real-time. The gleaned metrics are indicative of load levels concerning one or more applications. These gleaned metrics may be in a variety of formats, and may be from different sources, both internal or external to the applications. The proactive autoscaling system automatically predicts scaling events based on gleaned metrics. Prior to the occurrence of a predicted scaling event, the proactive autoscaling system can automatically scale computing resources available to one or more target applications, in response to the predicting of the scaling event.

26 Claims, 3 Drawing Sheets

UNIVERSAL, PROACTIVE, AND DYNAMIC SCALING OF COMPUTING RESOURCES

TECHNICAL FIELD

This disclosure pertains generally to automatically scaling computing resources, and more specifically to using heuristics and artificial intelligence (AI) proactively and dynamically, to scale computing resources prior to changes in load levels, without limitation by use case or platform.

BACKGROUND

The loads on computing systems change over time, and it is desirable to allocate computing resources accordingly. For example, as more HTTP requests are made to a website, it desirable to automatically make more network bandwidth available to the website, as well as more processing capability and other resources used by the website to manage the incoming requests. When the request load decreases, allocation of resources to the website may be automatically decreased.

Conventional autoscaling is reactive, meaning that it scales resources up and down in response to detecting changes in load levels that have already occurred. In addition, conventional auto-scalers are tied to specific platforms and use cases. For example, a conventional auto-scaler may be built to scale up resources devoted to a website based on an increase in requests made to that site. In another example, a conventional auto-scaler may be built to increase or decrease storage allocated to a cloud-based backup system in response to more or less client usage. Each of these conventional system is built to provide autoscaling in the context of a specific use case, within a given computing ecosystem or platform.

It would be desirable to address these issues.

SUMMARY

A proactive autoscaling system may use heuristics and machine learning to proactively, dynamically and automatically scale computing resources allocated to applications, prior to the occurrence of the scaling events themselves. The proactive autoscaling system may be stateless, and may be agnostic to use case, platform, field of endeavor, or communication protocol used by the applications. The proactive autoscaling system may further be agnostic to the type of computing resources being scaled.

The proactive autoscaling system gleans metrics in real-time. The gleaned metrics are indicative of load levels concerning one or more applications. These gleaned metrics may be in a variety of formats, and may be from different sources. For example, metrics may be gleaned from the applications (e.g., metrics concerning historical use of one or more applications over time). Instead or in addition, metrics may be gleaned from sources external to the applications, such as electronic news media, electronic marketing activity, a level of requests for support concerning one or more applications, social media, email, text messages, etc.

The proactive autoscaling system automatically predicts scaling events based on gleaned metrics. For example, heuristics may be used to automatically predict scaling events, based on gleaned metrics. Empirical data may be tracked over time, such gleaned metrics, predictions of scaling events, occurrences of predicted scaling events, occurrences of the scaling of computing resources in response to predicted scaling events, results of occurrences of scaling computing resources, etc. The heuristics may be refined, based on tracked empirical data. The refined heuristics may then be used to automatically predict additional scaling events, thereby improving the predictions.

Machine learning techniques may also or instead be applied to the tracked empirical data. In response to results of applying the machine learning techniques, additional scaling events may be automatically predicted, and/or extents to which computing resources are scaled may be automatically adjusted.

Prior to the occurrence of a predicted scaling event, the proactive autoscaling system may automatically scale computing resources available to one or more target applications, in response to the predicting of the scaling event. For example, hardware and/or software resources allocated to applications may be automatically increased and/or decreased.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various example implementations for purposes of illustration only. One skilled in the art will readily recognize from the following discussion that alternative examples of the structures and methods illustrated herein may be employed without departing from the principles described herein.

DETAILED DESCRIPTION

Figure 1:
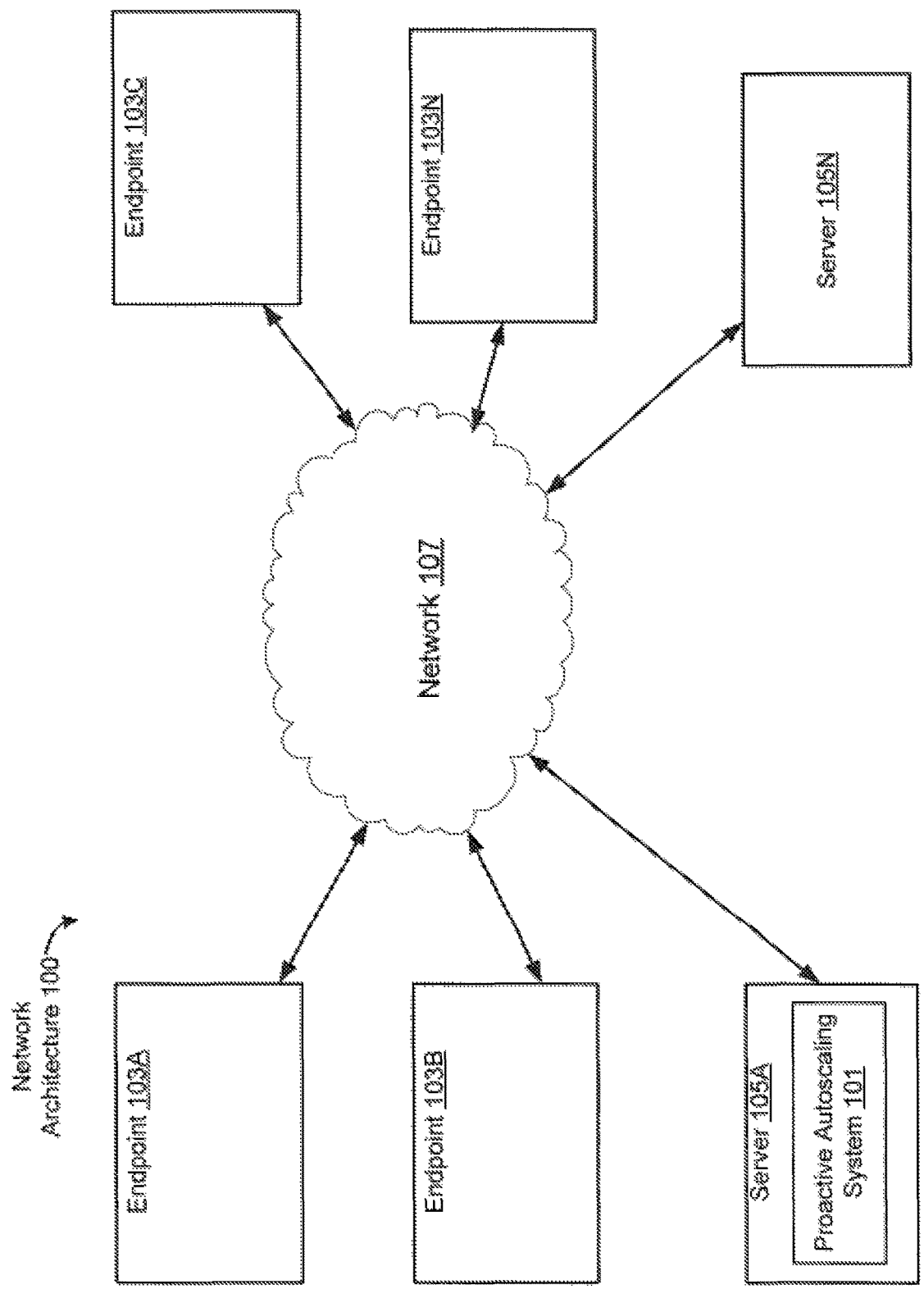
FIG. 1 is a block diagram of an exemplary network architecture in which a proactive autoscaling system can be implemented.
Figure 2:
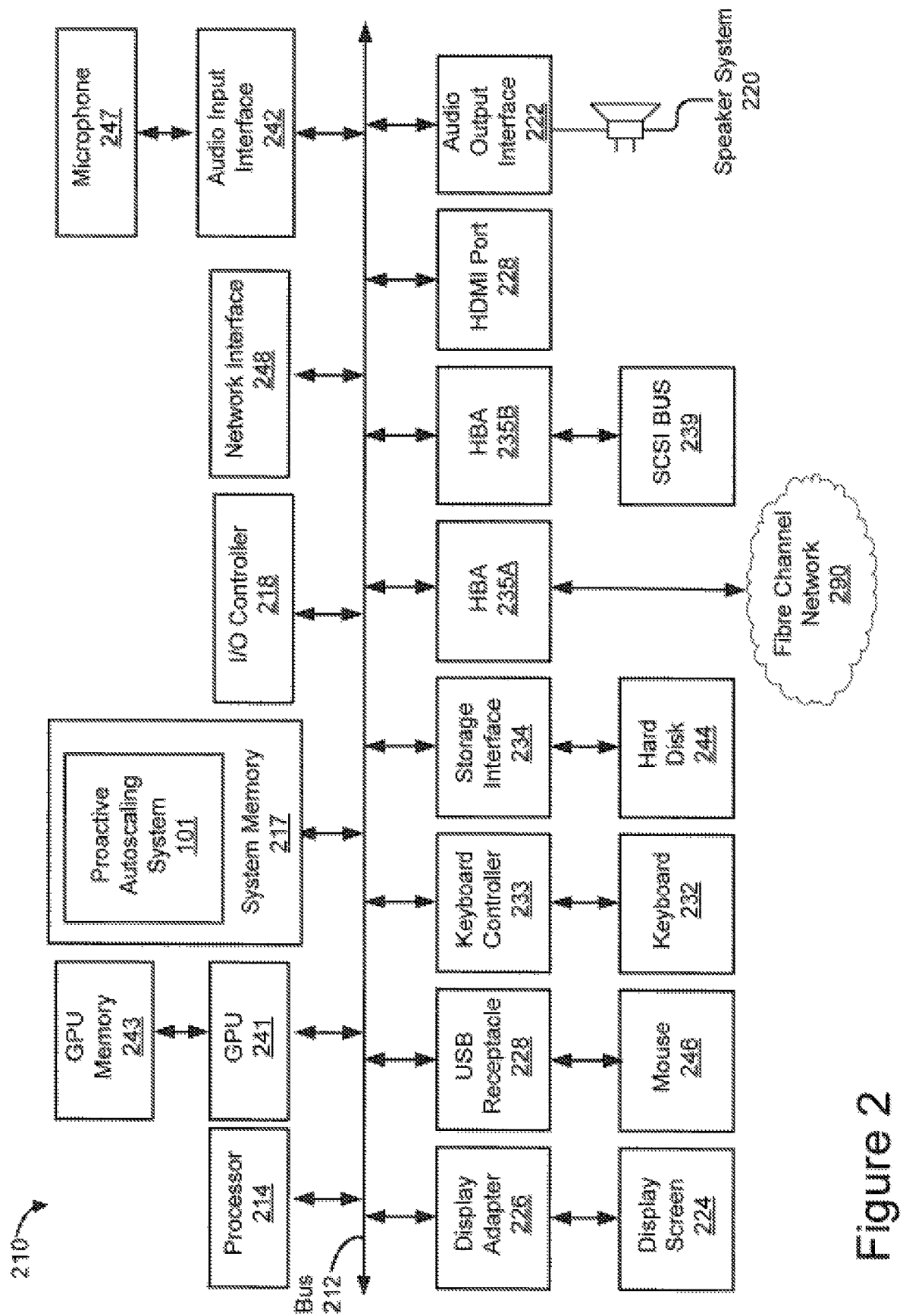
FIG. 2 is a block diagram of a computer system suitable for implementing a proactive autoscaling system.
Figure 3:
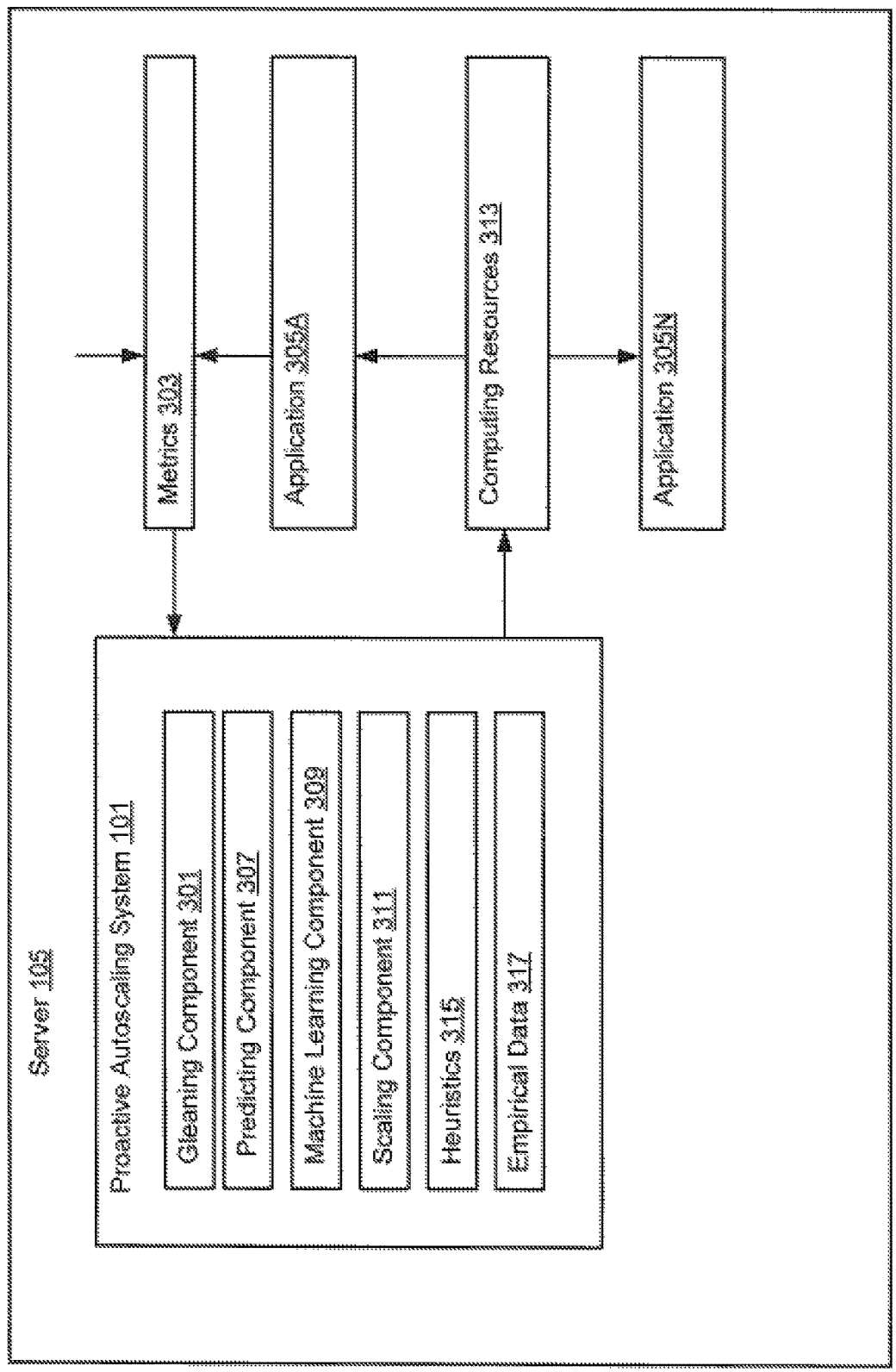
FIG. 3 is a high level block diagram of an exemplary operation of a proactive autoscaling system.

As described herein and illustrated in FIG. 1-3, a proactive autoscaling system 101 can use heuristics and machine learning to proactively, dynamically and automatically scale computing resources (e.g., hardware and/or software resources) allocated to applications up and down, prior to scaling events that cause changes in load levels. The proactive autoscaling system 101 may be stateless, and may be agnostic to use case, platform, field of endeavor, or communication protocol used by the applications. As described in more detail below, the proactive autoscaling system 101 gleans metrics in real-time. The gleaned metrics are indicative of load levels concerning one or more applications. These gleaned metrics may be in a variety of formats, and may be from different sources, both internal or external to the applications. The proactive autoscaling system 101 automatically predicts scaling events based on gleaned metrics. Prior to the occurrence of a predicted scaling event, the proactive autoscaling system can automatically scale computing resources available to one or more target applications, in response to the predicting of the scaling event.

FIG. 1 is a block diagram illustrating an exemplary network architecture 100 in which a proactive autoscaling system 101 can be implemented. In the illustrated network architecture 100, endpoint systems 103A, 103B, 103C and 103N, as well as servers 105A and 105N, are communicatively coupled to a network 107. It is to be understood that in practice orders of magnitude more endpoints 103 and servers 105 can be deployed. A proactive autoscaling system 101 is illustrated as residing on server 105A. It is to be understood that in different implementations the proactive autoscaling system 101 can reside on different computers 210, or be distributed between multiple computing systems 210 in different ways as desired.

Many different networking technologies can be used to provide connectivity from each of endpoint computing devices 103A-N and servers 105A-N to network 107. Some examples include: WAN, LAN, and various wireless technologies (e.g., Mobile WiMAX, LTE, etc.). Endpoint systems 103A-N are able to access applications and/or data on server 105A or 105N using, for example, a web browser or other endpoint software (not shown). Endpoints 103 can be in the form of, for example, desktop computers, laptop computers, smartphones or other mobile or wearable computing devices, comprising portable computing devices capable of connecting to a network 107 and running applications. Servers 105 can be in the form of, for example, rack mounted or tower computers.

Although FIG. 1 illustrates four endpoints 103A-N and two servers 105A-N as an example, in practice many more (or fewer) computers can be deployed as noted above. In one implementation, the network 107 is in the form of the internet. Other networks 107 or network-based environments can be used in addition to or instead of the internet in other implementations. For example, in one implementation, the network 107 is in the form of a private network of a given organization (e.g., an enterprise, university, government, etc.), which may be communicatively coupled to the internet.

FIG. 2 is a block diagram of a computer system 210 suitable for implementing a proactive autoscaling system 101. Endpoints 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), a graphics processing unit (GPU) 241, GPU memory 243, an input/output (I/O) controller 218, an audio input interface 242 communicatively coupled to an audio input device such as a microphone 247, an audio output interface 222 communicatively coupled to an audio output device such as a speaker 220, a display adapter 226 communicatively coupled to a video output device such as a display screen 224, one or more interfaces such as Universal Serial Bus (USB) ports 228, High-Definition Multimedia Interface (HDMI) ports 230, serial ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, a mouse 246 (or other pointing device) coupled to the bus 212, e.g., via a USB port 228, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have external keyboards 242 or external pointing devices 246, although various external components can be coupled to mobile computing devices via, e.g., USB ports 228). In different implementations the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, solid state drive, flash memory) and loaded into system memory 217 and executed by the processor 214. Application programs can also be loaded into system memory 217 from a remote location (i.e., a remotely located computer system 210), for example via the network interface 248. In FIG. 2, the proactive autoscaling system 101 is illustrated as residing in system memory 217. The workings of the proactive autoscaling system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 can be directly or indirectly communicatively coupled to a network 107 such as the internet. Such coupling can be wired or wireless.

FIG. 3 illustrates a proactive autoscaling system 101 running on a server 105, according to one example embodiment. As described above, the functionalities of the proactive autoscaling system 101 can reside on specific computers 210 (e.g., servers 105, endpoints 103) or be otherwise distributed between multiple computer systems 210, including within a fabric/cloud-based computing environment in which the functionality of the proactive autoscaling system 101 is provided as a service over a network 107. It is to be understood that although the proactive autoscaling system 101 is illustrated in FIG. 3 as a single entity, the illustrated proactive autoscaling system 101 represents a collection of functionalities, which can be instantiated as a single or multiple modules as desired (an instantiation of a specific, multiple module proactive autoscaling system 101 is illustrated in FIG. 3). It is to be understood that the modules of the proactive autoscaling system 101 can be instantiated (for example as object code or executable images) within the system memory 217 (e.g., RAM, ROM, flash memory) (and/or the GPU memory 243) of any computer system 210, such that when the processor(s) 214 (and/or the GPU 241) of the computer system 210 processes a module, the computer system 210 executes the associated functionality. In some implementations, the GPU 241 can be utilized for some or all of the processing of given modules of the proactive autoscaling system 101. In different implementations, the functionality of some or all of the modules of the proactive autoscaling system 101 can utilize the CPU(s) 214, the GPU 241, or any combination thereof, as well as system memory 217, GPU memory 243, or any combination thereof as desired.

As used herein, the terms "computer system," "computer," "endpoint," "endpoint computer," "server," "server computer" and "computing device" mean one or more computers configured and/or programmed to execute the described functionality. Additionally, program code to implement the functionalities of the proactive autoscaling system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As illustrated in FIG. 3, a gleaning component 301 of the of the proactive autoscaling system 101 gleans metrics 303 in real-time. These gleaned metrics 303 can be in the form of any data indicative of load levels concerning one or more applications 305. The gleaning component 301 can be configured to glean metrics 303 in real-time from multiple different sources, in a variety of different formats, thus making the proactive autoscaling system 101 agnostic to the format of the metrics 303. In different implementations, metrics 303 can be gleaned from applications 305 that are targeted by the proactive autoscaling system 101 (i.e., applications 305 for which computing resources 313 are automatically scaled as described below). Some examples of metrics 303 gleaned from applications 305 include historical use data at any level of granularity (e.g., per period of time such as day/hour/minute/etc., weekday versus weekend, per customer, per organization, on specific holidays, by feature, etc.). In such implementations the gleaning component 301 may be configured to read logs or other forms of output provided or otherwise generated by the application(s) 305 in various formats, and parse that information in its native format to glean the metrics 303 of interest.

The gleaning component 301 may also glean metrics 303 from sources outside of targeted applications 305, such as from electronic news media (e.g., events in the news associated with a predicted increase or decrease in use), electronic marketing activity (e.g., an announcement of a new release of an application 305 via a press release on a website, an increase in marketing activity, an announcement concerning an anticipated downtime for specific features, etc.), a level of requests for support concerning one or more applications (e.g., requests made via phone, email, text, a customer support service application such as Zendesk®, etc.), social media activity concerning an application 305, discussions concerning an application 305 on other forms of electronic media, etc. In such implementations, the gleaning component 301 may be configured to automatically monitor, read and/or parse electronic news and other media sources, social media feeds, electronic communications, announcement sections of websites and the like, as well as interface with or otherwise process output from customer support or other types of third party services, in order to glean relevant metrics 303.

A predicting component 307 of the of the proactive autoscaling system 101 automatically predicts scaling events, based on gleaned metrics 303. As the term is used herein, a "scaling event" means any activity or occurrence that results in the load level of one or more target applications 305 increasing or decreasing to an extent such that it is desirable to scale the computing resources 313 allocated to the application(s) 305 up or down. It is to be understood that the thresholds at which a change in load level is considered sufficiently significant to auto-scale a corresponding allocation of computing resources 313 is a variable design parameter that can be adjusted up and down in different implementations, for different applications 305, under different circumstances, etc.

In one implementation, the predicting component 307 uses heuristics 315 to automatically predict scaling events based on gleaned metrics 303. For example, the predicting component 307 may track empirical data 317 over time, such as gleaned metrics 303, past predictions of scaling events based on gleaned metrics 303, actual occurrences of predicted scaling events (or the non-occurrence thereof), past occurrences of having scaled specific computing resources 313 up and/or down in response to predicted scaling events, and results of such past occurrences of resource scaling. The heuristics 315 used to automatically predict scaling events can be refined, based on tracked empirical data 317 (e.g., at set intervals, periodically, etc.), thereby resulting in improved heuristics 315. The refined heuristics 315 to automatically predict additional future scaling events, thereby improving the accuracy of predictions over time.

The tracked empirical data 317 may also be input into a machine learning component 309 of the proactive autoscaling system 101. The machine learning component 309 may apply machine learning techniques to the empirical data 317 tracked over time. The machine learning can be used in this context to improve the accuracy of future predictions of scaling events, as well improve amounts by which to auto-scale computing resources 313 for different applications 305 under different circumstances, at any level of granularity. In addition, statistics concerning this tracked empirical data 317 may be compiled at any level of granularity. Compiled statistics and other information concerning this tracked data can be fed back into the machine learning component 309, and/or used to generate reports to be provided to users such as supervisors and managers.

In response to the predicting of a scaling event, a scaling component 311 of the proactive autoscaling system 101 may automatically scale computing resources 313 available to one or more target applications 305, prior to the occurrence of the predicted scaling event. This can take the form of automatically scaling hardware resources (e.g., processing cycles, memory, storage, network bandwidth, etc.) and/or software resources, for example by increasing and/or decreasing current allocations of computing resources 313 to one or more applications 305. This enables the proactive autoscaling system 101 to dynamically adjust resources allocations proactively, based on predicted scaling events, as opposed to reactively in response to scaling events that have already occurred.

As noted above, the proactive autoscaling system 101 is agnostic to the specific target application(s) 305 for which to auto-scale computing resources 313. Thus, the proactive autoscaling system 101 can auto-scale resources for multiple applications 305 utilizing different communication protocols, in different fields of endeavor, under different platforms, ecosystems, operating environments, etc. In addition, the proactive autoscaling system 101 is agnostic to the specific computing resources 313 to scale. Thus, the proactive autoscaling system 101 is not confined to operation under any specific use case. For example, the proactive autoscaling system 101 can operate in the context of databases or other forms of data storage, document management, websites, computer security, development environments, IoT systems, network management, facilitating audiovisual calls (e.g., VoIP) between endpoints, etc.

To give one specific example, in one implementation the proactive autoscaling system 101 automatically scales computing resources 313 available to one or more applications 305 in the context of transferring audiovisual content between multiple endpoints, for example in a context of facilitating audiovisual calls. In such an example use case, the proactive autoscaling system 101 can automatically scale resources such as audiovisual processing services, endpoint detection services, speech recognition processing, audio to text processing, natural language processing, network bandwidth, storage, processor cycles, etc. It is to be understood that this is just one example use case, and many others are both possible and contemplated.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory, and the mechanisms that implement the invention or its features may have different names, divisions and/or formats. The foregoing description, for purpose of explanation, has been described with reference to specific examples. However, the illustrative discussions above are not intended to be exhaustive or limiting to the precise forms disclosed. Many modifications and variations are possible in view of the above teachings. The examples were chosen and described in order to best explain relevant principles and their practical applications, to thereby enable others skilled in the art to best utilize various examples with or without various modifications as may be suited to the particular use contemplated.

What is claimed is:

1. A computer implemented method, comprising:
    gleaning metrics in real-time, the gleaned metrics being indicative of load levels concerning one or more applications, wherein the gleaning metrics in real-time includes gleaning metrics from outside of the one or more applications from at least one source from a group of sources consisting of: electronic news media, electronic marketing activity, a level of requests for support concerning the one or more applications, social media, email, and text messages;
    automatically predicting a scaling event based on gleaned metrics; and
    automatically scaling computing resources available to one or more applications, in response to the predicting of the scaling event, prior to an occurrence of the scaling event to implement stateless, proactive autoscaling, that is agnostic to communication protocols used by the one or more applications, is agnostic to fields of endeavor of the one or more applications, and is agnostic to formats of the gleaned metrics.

2. The method of claim 1 wherein the gleaning metrics in real-time further comprises:
    gleaning metrics in real-time from a plurality of different sources.

3. The method of claim 1 wherein the gleaning metrics in real-time further comprises:
    gleaning metrics in real-time in a plurality of different formats.

4. The method of claim 1 wherein the gleaning metrics in real-time further comprises:
    gleaning metrics concerning historical use of at least one application over time.

5. The method of claim 1 wherein the gleaning metrics in real-time further comprises:
    gleaning metrics from outside of the one or more applications.

6. The method of claim 5 wherein the gleaning metrics from outside of the one or more applications further comprises:
    gleaning metrics from at least one source from a group of sources consisting of: electronic news media, electronic marketing activity, a level of requests for support concerning the one or more applications, social media, email, and text messages.

7. The method of claim 1 wherein the automatically scaling computing resources available to one or more applications further comprises performing one from a group consisting of:
    automatically scaling hardware resources; and
    automatically scaling software resources.

8. The method of claim 1 wherein the automatically scaling computing resources available to one or more applications further comprises performing one from a group consisting of:
    automatically increasing a current allocation of computing resources to one or more applications; and
    automatically decreasing a current allocation of computing resources to one or more applications.

9. The method of claim 1 further comprising:
    automatically scaling computing resources available to multiple applications, the multiple applications utilizing different communication protocols.

10. The method of claim 1 further comprising:
    automatically scaling computing resources available to multiple applications, the multiple applications being in different fields of endeavor.

11. A computer implemented method, comprising:
    gleaning metrics in real-time, the gleaned metrics being indicative of load levels concerning one or more applications;
    automatically predicting a scaling event based on gleaned metrics, wherein the automatically predicting a scaling event based on gleaned metrics includes using heuristics to automatically predict the scaling event, based on the gleaned metrics; and
    automatically scaling computing resources available to one or more applications, in response to the predicting of the scaling event, prior to an occurrence of the scaling event to implement stateless, proactive autoscaling, that is agnostic to communication protocols used by the one or more applications, is agnostic to fields of endeavor of the one or more applications, and is agnostic to formats of the gleaned metrics.

12. The method of claim 11 further comprising:
    tracking empirical data over time, the empirical data comprising one or more of gleaned metrics, predictions of scaling events, occurrences of predicted scaling events, occurrences of scaling computing resources in response to predicted scaling events, and results of occurrences of scaling computing resources;
    refining the heuristics used to automatically predict, based on the tracked empirical data; and
    using the refined heuristics to automatically predict at least one additional scaling event.

13. A computer implemented method, comprising:
    gleaning metrics in real-time, the gleaned metrics being indicative of load levels concerning one or more applications;
    automatically predicting a scaling event based on the gleaned metrics;
    automatically scaling computing resources available to one or more applications, in response to the predicting of the scaling event, prior to an occurrence of the scaling event to implement stateless, proactive autoscaling, that is agnostic to communication protocols used by the one or more applications, is agnostic to fields of endeavor of the one or more applications, and is agnostic to formats of the gleaned metrics; and tracking empirical data over time, the empirical data comprising one or more of gleaned metrics, predictions of scaling events, occurrences of predicted scaling events, occurrences of scaling computing resources in response to predicted scaling events, and results of occurrences of scaling computing resources.

14. The method of claim 13 further comprising:
compiling statistics concerning the tracked empirical data.

15. The method of claim 13 further comprising:
applying machine learning techniques to the tracked empirical data; and
in response to results of the applying the machine learning techniques, automatically predicting at least one additional scaling event.

16. The method of claim 13 further comprising:
applying machine learning techniques to the tracked empirical data; and
in response to results of the applying the machine learning techniques, automatically adjusting a degree to which computing resources available to one or more applications are scaled, in response to predicting at least one additional scaling event.

17. A computer implemented method, comprising:
gleaning metrics in real-time, the gleaned metrics being indicative of load levels concerning one or more applications;
automatically predicting a scaling event based on the gleaned metrics; and
automatically scaling computing resources available to one or more applications, in response to the predicting of the scaling event, prior to an occurrence of the scaling event, wherein the automatically scaling computing resources available to one or more applications includes:
automatically scaling computing resources available to one or more applications in a context of transferring audiovisual content between multiple endpoints to implement stateless, proactive autoscaling, that is agnostic to communication protocols used by the one or more applications, is agnostic to fields of endeavor of the one or more applications, and is agnostic to formats of the gleaned metrics.

18. The method of claim 17 wherein the automatically scaling computing resources available to one or more applications in a context of transferring audiovisual content between multiple endpoints further comprises:
automatically scaling computing resources available to one or more applications in a context of facilitating audiovisual calls between multiple endpoints.

19. The method of claim 17 wherein the automatically scaling computing resources available to one or more applications in a context of transferring audiovisual content between multiple endpoints further comprises:
automatically scaling at least one resource from a group consisting of:
audiovisual processing services;
endpoint detection services;
speech recognition processing;
audio to text processing; and
natural language processing.

20. A computer system comprising:
computer memory;
a gleaning component residing in the computer memory configured to glean metrics in real-time, the gleaned metrics being indicative of load levels concerning one or more applications;
a predicting component residing in the computer memory configured to automatically predict a scaling event based on the gleaned metrics; and
a scaling component residing in the computer memory configured to automatically scale computing resources available to one or more applications, in response to the predicting of the scaling event, prior to an occurrence of the scaling event; and
at least one processor configured to execute the components residing in the computer memory;
wherein the computer system is configured as:
a stateless, proactive autoscaling system, that is agnostic to communication protocols used by the one or more applications, is agnostic to fields of endeavor of the one or more applications, and is agnostic to formats of the gleaned metrics.

21. The computer system of claim 20 wherein the computer system is further configured as one of:
a cloud-based proactive autoscaling system; and
a proactive autoscaling system residing in a private network of an organization.

22. A computer system comprising:
computer memory;
a gleaning component residing in the computer memory configured for gleaning metrics in real-time, the gleaned metrics being indicative of load levels concerning one or more applications, wherein the gleaning metrics in real-time includes gleaning metrics from outside of the one or more applications from at least one source from a group of sources consisting of: electronic news media, electronic marketing activity, a level of requests for support concerning the one or more applications, social media, email, and text messages;
a predicting component residing in the computer memory configured to automatically predict a scaling event based on gleaned metrics;
a scaling component residing in the computer memory configured to automatically scale computing resources available to one or more applications, in response to the predicting of the scaling event, prior to an occurrence of the scaling event;
at least one processor configured to execute the components residing in the computer memory; and
the system configured to implement stateless, proactive autoscaling, that is agnostic to communication protocols used by the one or more applications, is agnostic to fields of endeavor of the one or more applications, and is agnostic to formats of the gleaned metrics.

23. A computer system comprising:
computer memory;
a gleaning component residing in the computer memory configured to glean metrics in real-time, the gleaned metrics being indicative of load levels concerning one or more applications;
a predicting component residing in the computer memory configured to automatically predict a scaling event based on the gleaned metrics, wherein automatically predicting a scaling event based on the gleaned metrics further includes using heuristics to automatically predict the scaling event, based on gleaned metrics;

a scaling component residing in the computer memory configured to automatically scale computing resources available to one or more applications, in response to the predicting of the scaling event, prior to an occurrence of the scaling event;

at least one processor configured to execute the components residing in the computer memory; and the system configured to implement stateless, proactive autoscaling, that is agnostic to communication protocols used by the one or more applications, is agnostic to fields of endeavor of the one or more applications, and is agnostic to formats of the gleaned metrics.

24. A computer system comprising:

computer memory;

a gleaning component residing in the computer memory configured to glean metrics in real-time, the gleaned metrics being indicative of load levels concerning one or more applications;

a predicting component residing in the computer memory configured to automatically predict a scaling event based on the gleaned metrics; and a scaling component residing in the computer memory configured to automatically scale computing resources available to one or more applications, in response to the predicting of the scaling event, prior to an occurrence of the scaling event, wherein the automatically scaling computing resources available to one or more applications further comprises:

automatically scaling computing resources available to one or more applications in a context of transferring audiovisual content between multiple endpoints;

at least one processor configured to execute the components residing in the computer memory; and the system configured to implement stateless, proactive autoscaling, that is agnostic to communication protocols used by the one or more applications, is agnostic to fields of endeavor of the one or more applications, and is agnostic to formats of the gleaned metrics.

25. A computer implemented method, comprising:

gleaning metrics in real-time, the gleaned metrics being indicative of load levels concerning one or more applications;

automatically predicting a scaling event based on the gleaned metrics, wherein automatically predicting a scaling event based on gleaned metrics includes using heuristics to automatically predict the scaling event, based on the gleaned metrics; and automatically scaling computing resources available to one or more applications, in response to the predicting of the scaling event, prior to an occurrence of the scaling event to implement stateless, proactive autoscaling, that is agnostic to at least two of: communication protocols used by the one or more applications, fields of endeavor of the one or more applications, and to formats of the gleaned metrics.

26. A computer system comprising:

computer memory;

a gleaning component residing in the computer memory configured to glean metrics in real-time, the gleaned metrics being indicative of load levels concerning one or more applications;

a predicting component residing in the computer memory configured to automatically predict a scaling event based on the gleaned metrics; and a scaling component residing in the computer memory configured to automatically scale computing resources available to one or more applications, in response to the predicting of the scaling event, prior to an occurrence of the scaling event; and at least one processor configured to execute the components residing in the computer memory;

wherein the computer system is configured as:

a stateless, proactive autoscaling system, that is agnostic to at least two of: communication protocols used by the one or more applications, fields of endeavor of the one or more applications, and to formats of the gleaned metrics.

* * * * *